(12) United States Patent
Gupta

(10) Patent No.: US 9,398,297 B2
(45) Date of Patent: Jul. 19, 2016

(54) INTEGRAL IMAGE CODING

(71) Applicant: Niraj Gupta, Bangalore (IN)

(72) Inventor: Niraj Gupta, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 187 days.

(21) Appl. No.: 14/071,006

(22) Filed: Nov. 4, 2013

(65) Prior Publication Data

US 2015/0125085 A1    May 7, 2015

(51) Int. Cl.
```
G06T 1/60      (2006.01)
G06T 9/00      (2006.01)
H04N 19/103    (2014.01)
H04N 19/423    (2014.01)
H04N 19/436    (2014.01)
```

(52) U.S. Cl.
CPC ............... *H04N 19/103* (2014.11); *G06T 1/60* (2013.01); *G06T 9/00* (2013.01); *H04N 19/423* (2014.11); *H04N 19/436* (2014.11)

(58) Field of Classification Search
None
See application file for complete search history.

(56) References Cited

U.S. PATENT DOCUMENTS

| | | | | |
|---|---|---|---|---|
| 5,790,137 A | * | 8/1998 | Derby et al. | 345/557 |
| 5,790,714 A | * | 8/1998 | McNeil | G06T 3/4007 |
| | | | | 348/581 |
| 6,456,283 B1 | * | 9/2002 | Ishida | 345/421 |
| 6,954,254 B2 | * | 10/2005 | Silverbrook | B41J 2/14 |
| | | | | 347/86 |
| 7,437,018 B1 | * | 10/2008 | Amirghodsi | 382/293 |
| 8,509,538 B2 | | 8/2013 | Li et al. | |
| 9,021,347 B2 | * | 4/2015 | Ito | G06K 9/00248 |
| | | | | 345/423 |
| 9,053,681 B2 | * | 6/2015 | Bigioi | G06T 1/0007 |
| | | | | 382/190 |
| 9,208,374 B2 | * | 12/2015 | Ito | G06T 1/60 |
| 2003/0038803 A1 | * | 2/2003 | Morein et al. | 345/421 |
| 2010/0228941 A1 | | 9/2010 | Koob et al. | |
| 2012/0081580 A1 | * | 4/2012 | Cote et al. | 348/231.99 |
| 2013/0138892 A1 | | 5/2013 | Loh et al. | |
| 2013/0238856 A1 | | 9/2013 | Loh et al. | |
| 2013/0272575 A1 | | 10/2013 | Li et al. | |
| 2014/0143499 A1 | * | 5/2014 | Olson et al. | 711/132 |

OTHER PUBLICATIONS

Kisačanin, Branislav. "Integral image optimizations for embedded vision applications." Image Analysis and Interpretation, 2008. SSIAI 2008. IEEE Southwest Symposium on. IEEE, 2008.*
Definition of cache line from dictionary.com, Aug. 6, 2015.*
International Search Report and Written Opinion for PCT/US2014/061567, mailed Jan. 23, 2015, 10 pages.

* cited by examiner

*Primary Examiner* — Michelle Entezari

(74) *Attorney, Agent, or Firm* — Lynch Law Patent Group, P.C.

(57) ABSTRACT

Techniques related to integral image coding are described herein.

20 Claims, 9 Drawing Sheets

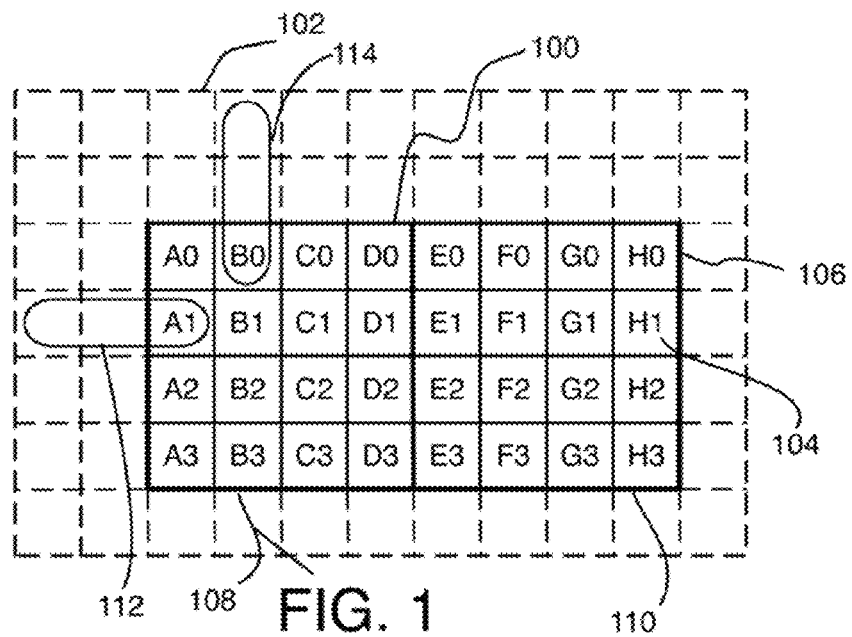

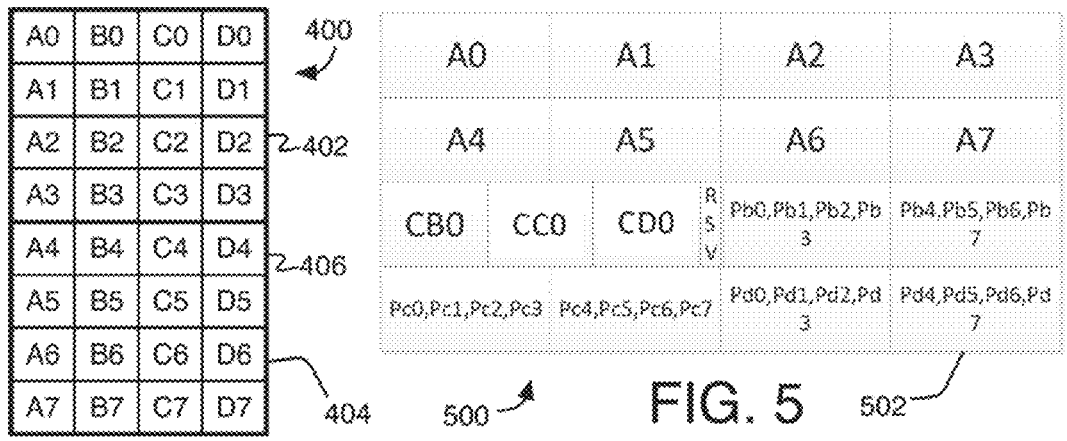
FIG. 4
FIG. 5
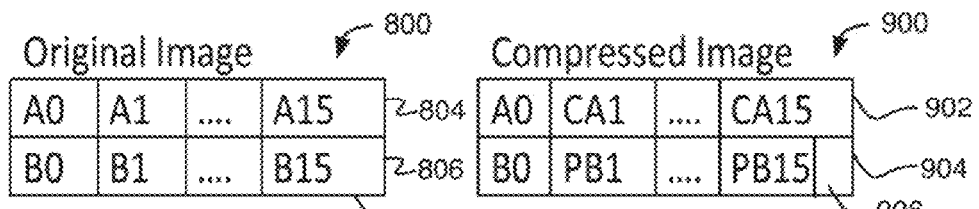
FIG. 8
FIG. 9
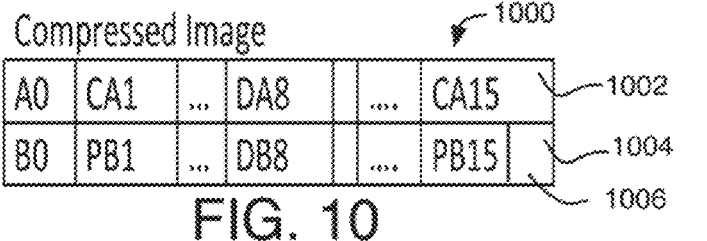
FIG. 10
FIG. 14

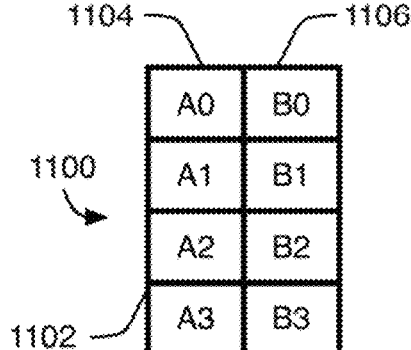
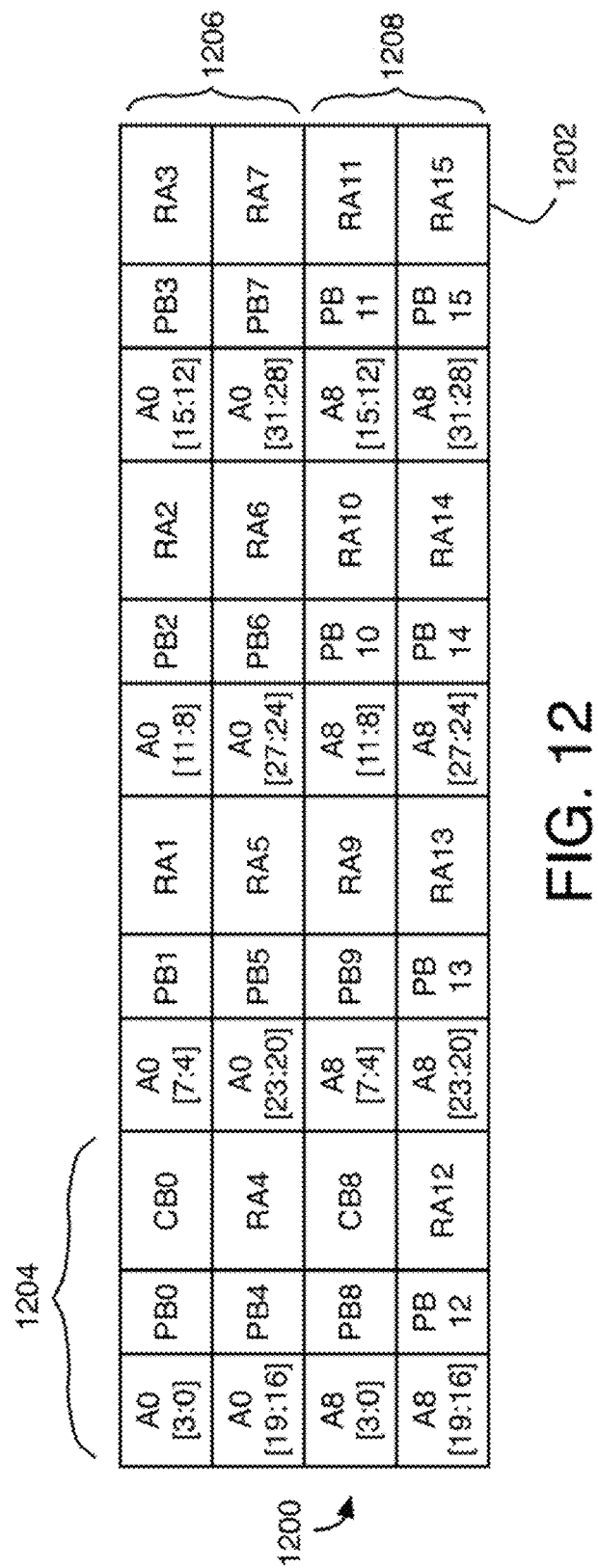
FIG. 11
FIG. 12

US 9,398,297 B2

INTEGRAL IMAGE CODING

BACKGROUND

An integral image, also referred to as a summed area table, is a table or block of sums where each sum is associated with a pixel position of an image or a block of pixels on the image. Each sum is a total of pixel values above and to the left of that pixel position and the pixel value at that pixel position. The pixel values may be luminance or chroma components. The integral image is used in various algorithms for video analytics, object identification or motion detection, image processing including smoothening or filtering, and so forth.

For many high traffic video coding systems, it is efficient to have the integral image available for cache. Cache, and other types of memory, receive and store blocks of data called cachelines. The cache, however, has a limited capacity, and the integral image may use more bandwidth on the cachelines than is necessary, which reduces the hit rate for other data.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 1 is an illustrative diagram of cachelines overlaid on an integral image;

FIG. 2 is an illustrative diagram of an example cacheline with a compressed data layout;

FIG. 3 is an illustrative diagram of another example cacheline with a compressed data layout;

FIG. 4 is an illustrative diagram of a portion of an integral image;

FIG. 5 is an illustrative diagram showing a compressed data layout for the integral image of FIG. 4;

FIG. 8 is an illustrative diagram of a horizontal, linear integral image;

FIG. 9 is an illustrative diagram showing another compressed data layout for the integral image of FIG. 8;

FIG. 10 is an illustrative diagram of another example compression layout for the integral image of FIG. 8;

FIG. 11 is an illustrative diagram of a vertical, linear integral image;

FIG. 12 is an illustrative diagram showing another example compression layout compatible with single instruction multiple data (SIMD) processing for the integral image of FIG. 11;

FIG. 14 is an illustrative diagram of an example 8×8 integral image;

DETAILED DESCRIPTION

Figures 6, 7:
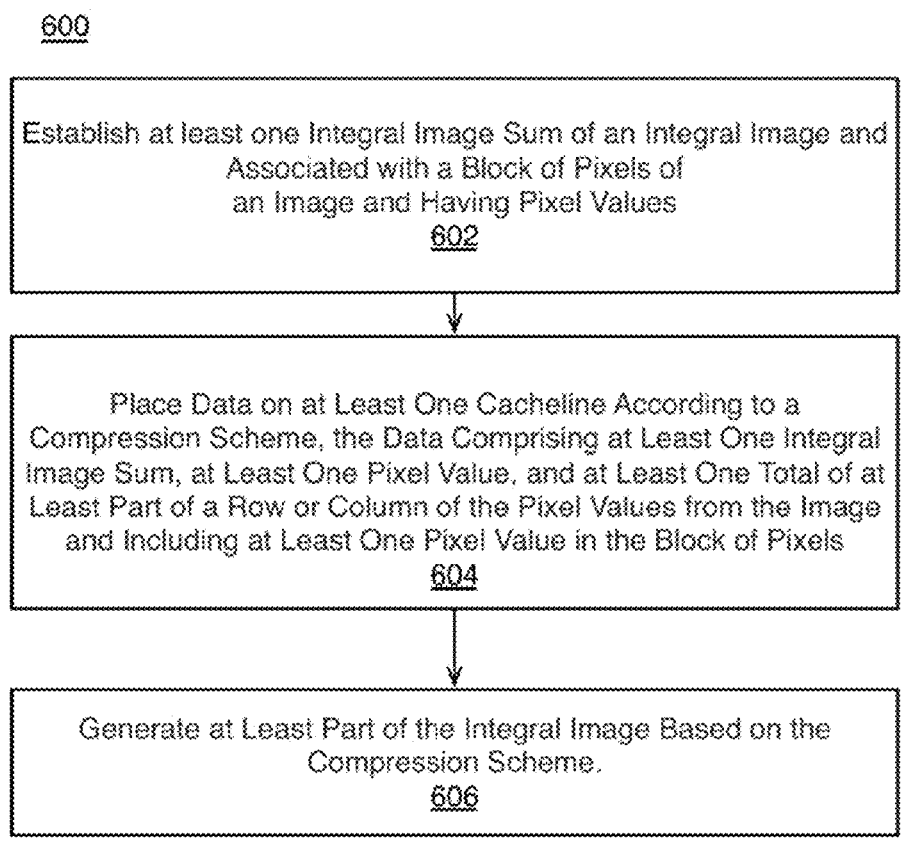
FIG. 6 is a flow chart showing an example process for integral image coding.
FIG. 7 is an illustrative diagram of an example data packing diagram for a compression scheme for a 12 bit input image.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation.

Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to integral image coding.

As described above, an integral image, or summed area table, is a block of sums where each sum is located at a pixel location of an image of frame formed of pixels. Each sum is a total of the pixel values above and to the left of the pixel location. Each sum also includes the pixel value at the pixel location of the sum. In video coding systems, the integral image can contain sums of pixel values, such as luminance or chroma values for example, and that may be used in many different image processing calculations, particularly whenever a total of pixel values of a selected pixel area or block on an image is needed. This may occur during object detection, such as face detection for example, motion detection, smoothening, box filtering, and so forth.

Also as mentioned above, image data such as an integral image may be placed in cachelines for transfer and storage at a memory, and in one example cache memory. However, herein the term cacheline is a block of data with a specific capacity that is used for memory transmissions and for defined storage units at many different types of storage devices, whether temporary or permanent, such as ROM, RAM, dynamic or static random access memory (DRAM or SRAM), whether volatile or non-volatile, and so forth. Many of these types of memories use a cacheline, including cache memory, with a 64 byte capacity. As used herein, then, a cacheline is not limited only for use with a cache memory.

Also, a cacheline may be considered to have many different shapes (or schematic forms) such as a 4×4 block of pixel locations, or a single, linear 1×16 row or column of pixel locations, and so on, and may be provided for explanatory purposes, and as shown in the examples below. It will be understood, however, that the structure may be different as actually transmitted and/or stored (such as actually linear when explained as a 4×4 grid for example). It also will be understood that storing a cacheline means that at least the values from the cacheline and the association between its value and a certain cacheline is stored so that the cacheline can be rebuilt when obtaining the cacheline from memory. Thus, the structure of the cacheline as stored may or may not correspond to the schematic structure of the cacheline.

For one example using cache memory, and for many high traffic video coding systems, it is efficient to have the integral image available for cache. In these cases, one or more cachelines are used to transmit and store the integral image values at the cache memory where the cache memory has a capacity for a limited number of cachelines. One aim discussed herein is to compress the integral image data to achieve a bit budget. For one example, each cacheline may be limited to 64 bytes (512 bits) or the like. Known integral images often require more than one cacheline for a memory transmission. The compression technique herein may transmit and/or store an integral image to reduce the number of cachelines used, or the portion of a cacheline used, so that the integral image fills less space at the cache memory, thereby leaving more space at the cache memory for other data, thereby increasing the hit rate, and saving power by reducing the number of reads and writes to main memory. This also provides greater memory capacity for other data at other types of storage devices receiving and storing the cachelines. Further, the reduction in cacheline space occupied by the integral image provides greater bandwidth for other data for memory transmissions to and from storage devices, whether or not to or from a cache memory, thereby increasing performance.

By the disclosure described herein, a compression scheme with a data packing layout may use less cachelines, or portion of a cacheline, than that used to place an integral image with all of its integral image sums into cachelines. This is accomplished for a block of integral image data by using a compression scheme or technique for one or more cachelines that transmits and stores less than all of the integral image sums of an integral image. Instead, other smaller values that use less bits are used. Additionally or alternatively, the compression scheme may use values that can be used to subsequently calculate multiple integral image sums when a cache hit occurs, or the data is otherwise needed, for example. Such a compression scheme may include pixel values and totals of rows and/or columns of pixel values in addition to the integral image values. Simple algorithms can then be used to decompress the data and reconstruct the integral image as needed. This may permit compression of 2:1 or better.

While the calculations used to reconstruct the integral image sums based on a cache hit may increase the compute load, and in turn power usage, at a processor for example, this increase is relatively small compared to the power savings by reducing the number of reads and writes on the integral image in main memory. The amount of power savings depends on the relative size of the cache.

Referring to FIG. 1, an image, or portion of an image 102 is provided where each square represents a pixel. Each pixel has a pixel value, such as a luminance or chroma value for example. A 4×8 integral image 100 with four rows and eight columns in 2D image space is shown on the image 102 for explanatory purposes, and has rows 0 to 3 and columns A to H such that each square 104 in the integral image 100 has an integral image sum A0 to H3. The integral image 100 is associated with, and overlays, a block 106 of pixel values the same size as the integral image so that each square 104 has an integral image sum that is associated with a pixel location and a pixel value at that location. In other words, the pixel location is the farthest corner, and in the presently illustrated example, the right-bottom corner, of values included in the integral image sum at that pixel location.

Also overlaying the integral image 100, two 4×4 cachelines 108 and 110 are provided horizontally next to each other for explanatory purposes. One cacheline 108 has columns A to D, while the other cacheline 110 has columns E to H. Both cachelines have rows 0 to 3. It will be understood that the integral images, the pixel blocks, and cachelines may have many different configurations as explained and provided in many examples below. Thus, by one example, the cachelines as actually stored may include the values as shown (A0 to D3 for the cacheline for cacheline 108) or may be stored in linear rows where each row is a cacheline (A0 to H0 for a first cacheline for example) as long as the total capacity remains the same (4×4 spaces versus 1×16 spaces where each space has the same capacity). For explanatory purposes, a pixel block of pixel values used for reconstructing integral image sums may be considered to be the same size as the integral image, but this need not always be true.

Also, rather than one next to the other in horizontal fashion, cachelines may be considered to be one over the other as shown in FIG. 4 for example, or the cachelines may be considered to be a linear block of data as shown in FIGS. 9-10 for example.

The integral image may be stored as sums for each pixel value from the 0 to X and 0 to Y co-ordinates for an entire image (also referred to as a picture or frame) for example that may have roughly approximately 1000 by 800 pixels, and creating a frame-wide integral image. In this case, the integral image 100 may only be a portion of that larger, frame-wide integral image, and may only use a small portion of the integral image sums that have been saved at a time. In this case then, when first needed, an entire integral image may be transmitted to, and stored on a memory, by using multiple cachelines when the integral image for an entire frame is larger than the capacity of a single cacheline as in most cases. Otherwise, the integral image sums may only be obtained and stored for a target or window on the frame and by using one or more of the integral images 100 such as when the integral image sums are being calculated on the fly as needed. This may occur, for example, when a video coding system is only analyzing a certain portion of a frame, such for face detection, and in this case may initially build the integral image(s) 100 and cachelines from stored pixel values, and only for the windows needed rather than for the entire integral image for the entire frame. Either way, in most cases, the integral image 100 here may only cover a portion of an entire image.

In the illustrated case, as mentioned, the integral image sums or values are recited as A0 to H3 located at each pixel position. Thus, for example, D2 is the sum of all of the pixel values from positions at A0 to D0, A1 to D1, and A2 to D2. Sum H3 includes the sum of all pixel values for the entire 4×8 block. It will be appreciated that this of course assumes the integral image is in the upper left corner of the entire image 102. Otherwise, the edge integral image sums A0 to A3 and A0 to H0 each already include all of the pixel values above and to the left from their respective positions and in the entire image or frame 102. Thus, in this case, D2 is an integral image sum that also includes the pixel values above and to the left of the D2 position and including outside of the integral image 100 when calculated by directly or indirectly using at least one of the edge sums.

The integral image can either be stored as 32 bits or 64 bits per pixel depending on the image size. For most needs up to high definition (HD) images, a 32 bit per pixel integral image is normally sufficient to provide for 8 bits of pixel data per pixel component (for example, luminance or chroma values). In the illustrated example, the values are luminance values. It will be understood that a separate integral image may be provided for each component. When luminance values range from 0 to 255 (for 8 bits), the lower, right sums on the entire image can become relatively large justifying the 32 bit allocation for each integral image sum. For the cachelines shown on FIG. 1, each cacheline 108 and 110 typically holds 64 bytes (512 bits) and can hold data for a 4×4 block of pixel sums at 32 bits per pixel.

Referring to FIG. 2, a compression technique (also referred to herein as a plan, scheme, or layout) is provided so that the integral image 100 shown in FIG. 1 using two cachelines is compressed 2:1 so that it only uses one cacheline instead. This is accomplished by providing a compression scheme 200 on an example, modified 4×4 cacheline 202 where, generally, each space 204 is 32 bits except where two spaces have been modified as explained below. Only one row of eight integral image values A0 to H0 from the integral image 100 are arranged on the compression scheme 200, and to fill two rows of the cacheline 202. The remaining integral image values A1 to H3 are calculated using the integral image values A0 to H0 as explained below. Six of the 32 bit spaces 204 on the cacheline 202 are filled with the 8 bit individual pixel values labeled Pa1 to Ph3 for twenty-four pixel values, and that correspond with the pixel locations of FIG. 1 so that four pixel values are placed in each space 204.

The example compression scheme 200 also includes three totals of a row of pixel values RA1, RA2, and RA3 that includes at least one pixel value each. In the illustrated example, each row total includes the pixel values to the left of the pixel location indicated and the pixel value at that location. For instance, row total RA1 (112 on FIG. 1) includes the pixel values to the left of the A1 position and the pixel value at position A1. RA2 and RA3 are similar for their respective rows. In the present example where the integral image sums include all values above and to the left of the indicated sum position, the row totals may include all of the pixel values from a left edge of the image 102 up to and including the pixel value at the pixel location indicated by the label of the integral image sum. When the integral image 100 and pixel block 106 are positioned along the left edge of the image 100 so that position A1 is the first position in the row for the whole image, in this case RA1 is simply the single pixel value at that position A1.

By another approach, it will be understood column totals may be used in addition to, or instead of, row totals as described below. By yet other alternatives, the integral image may be based on a system extending from a different corner of a frame other than the upper left corner so that the row or column totals may be totals of pixel values from a different edge of the frame such as from the right edge of the frame for row totals or even the lower edge of the frame for column totals. Thus, for example, an integral image sum may be the sum of all pixel values above and to the right of a certain pixel location. In this case, the column totals still may extend from the upper edge of the frame but now the row totals may extend from the right edge of the frame, and so forth.

It also will be understood that the row and column totals need not always be at a pixel location that forms an edge of the pixel block (such as pixel block 106) being analyzed. The row or column total may be an interior location within the pixel block and therefore include pixel values up to and including that interior pixel location.

In the illustrated example, each of the row totals RA1 to RA3, or more specifically, the space reserved for the row totals, may be 20 bits each, and 4 bits may be reserved to form a 64 bit space altogether to fill the same space as two of the 32 bit spaces 104. In one form, the row totals may be 19 to 24 bits each. This may depend on the size or resolution of the image, which sets the maximum possible row or column total. For a HD image of 1920 pixels across a row or 1080 pixels for a column with a maximum 255 value at each pixel location provides a maximum value of 489,600 as a maximum integral image sum for any row or column, which is about 19 digits in binary. The range here is selected for a screen of approximately 1920×1080 pixels, but many different screen resolutions exist. Thus, it will be understood that a selection of other bit sizes for the integral image sums may be used.

Thus, this compression scheme provides 2:1 compression since a total of 128 bits per row is maintained, and 128 bits×four rows equals the 64 byte (512 bit) for a single tile Y (as in per row at position Y) cacheline, where the original integral image 100 uses 32×32 bits for a total of 1024 bits when 8-bit pixel values are used in the original image for which the integral image was constructed with 32 bits per pixel location. For other pixel value sizes, such as pixel values stored as 16-bits per pixel, the original integral image may extend on multiple 64-byte cachelines providing 64 bits per integral image sum (or per pixel location). Thus, in this case, the original integral image may use four cachelines, and may be compressed by the compression schemes herein to two cachelines.

It will also be understood that the compression scheme may have many different arrangements as long as all of the cacheline spaces are allocated. This enables construction of the entire 4×8 integral image upon a cache hit.

Referring to FIG. 3, an alternative compression scheme 300 is shown on a cacheline 302 where the compression scheme 300 is similar to the compression scheme 200 except here the row total values RA1 to RA3 are 24 bits each, and twenty-one 8-bit pixel values Pb1 to Ph3 are provided. Twenty of the pixel values Pc1 to Ph3 are provided in five 32-bit spaces 304, while one 8-bit pixel value PM is provided in a modified 96 bit space with the three row totals and a 16-bit reserve. In this example, the 'A' column of pixel values (at locations A1 to A3) are not provided since they are already included in the row totals RA1 to RA3 as explained above.

In the case of a cache hit, in order to construct the integral image 100 from compression scheme 300, base or seed values, such the integral image sums A0 to H0 already provided in the cacheline may be used to calculate other integral image sums with the following equations, or similar equations:

$$A1 = A0 + RA1 \quad (1)$$

$$A2 = A1 + RA2 \quad (2)$$

$$A3 = A2 + RA3 \quad (3)$$

Integral image sums B1 to H1 can be calculated with similar sample equations as will be understood, as follows:

$$B1 = B0 + RB1, \text{ where } RB1 = RA1 + Pb1 \quad (4)$$

$$C1 = C0 + RC1, \text{ where } RC1 = RB1 + Pc1 \quad (5)$$

Integral image sums D1 to H1 can be derived by using equations similar to that of equations (4) and (5) above. The remainder of the third row of integral image 100 (B2 to H2) can be calculated as follows:

$$B2 = B1 + RB2, \text{ where } RB2 = RA2 + Pb2 \quad (6)$$

$$C2 = C1 + RC2, \text{ where } RC2 = RB2 + Pc2 \quad (7)$$

Integral image sums D2 to H2 can be derived by using equations similar to that of equations (6) and (7) above. Finally, the remainder of the fourth row of integral image 100 (B3 to H3) can be calculated as follows:

$$B3 = B2 + RB3, \text{ where } RB3 = RA3 + Pb3 \quad (8)$$

$$C3 = C2 + RC3, \text{ where } RC3 = RB3 + Pc3 \quad (9)$$

Integral image sums D3 to H3 can be derived by using equations similar to that of equations (8) and (9) above.

It will be appreciated that the compression scheme may have many different arrangements as long as, by one form, at least one integral image sum, at last one pixel value, and at least one total of a row or column of pixel values is provided in the compression scheme to be placed in at least one cacheline.

Referring to FIGS. 4-5, by another alternative, instead of row totals, the compression scheme may include column totals. In this example, a tall integral image 400 is similar to horizontal integral image 100 except here integral image 400 has eight rows A0 to A7 and four columns A0 to D0. Such an integral image 400 may have originally been transmitted by two 4×4 cachelines 402 and 404 one above the other. The compression scheme 500 used to compress integral image 400 on a single cacheline 502 may be similar to compression scheme 200 as shown (or compression scheme 300 as well) except here instead of RA1 to RA3, column pixel value totals CB0, CC0, and CD0 may be used and that are similar to the row totals only extending vertically on an image. Such column totals could also be used on integral image 100 as exemplified by column total 114 on FIG. 1, for example. Thus, as with the rows, the column total may be a total of pixel values in a column and extending from an edge of the image, and here an upper edge, and up to, and including, a pixel value within the pixel block 406 corresponding to the integral image 400. In one form, this may be an edge pixel location forming an edge of the pixel block (such as locations A0 to D0). As explained below, the column total, and row total may alternatively extend to a more interior pixel location in the pixel block. Likewise, the outer pixel values for the column or row totals may begin away from the edge of the image or frame. Eight-bit pixel values Pb0 to Pd7 totaling twenty-four pixel values may also be provided in the compression scheme 500.

It will be understood that equations similar to those used above for compression scheme 302 may be used here so that a chain of calculations may be used, where a subsequent equation may use values obtained from a previous equation. Thus, in the present case, where A0 to H0 are provided to the cacheline 502 in the compression scheme 500, some of the equations may be as follows:

$$B1 = A1 + CB0 + Pb1 \quad (10)$$

$$B2 = A2 + B1 + Pb2 \text{ (or } B2 = A2 + CB1, \text{ where } CB1 = B1 + Pb2) \quad (11)$$

and so forth until all of the integral sums of the integral image 400 are calculated as needed.

Referring to FIG. 6, a flow chart illustrates an example process 600, arranged in accordance with at least some implementations of the present disclosure. In general, process 600 may provide a computer-implemented method for integral image coding for cache memory. In the illustrated implementation, process 600 may include one or more operations, functions or actions as illustrated by one or more of operations 602, 604, and 606. By way of non-limiting example, process 600 will be described herein with reference to operations discussed with respect to FIGS. 1-5 above and example system 1700 discussed below.

Process 600 includes an operation to "ESTABLISH AT LEAST ONE INTEGRAL IMAGE SUM OF AN INTEGRAL IMAGE ASSOCIATED WITH A BLOCK OF PIXELS OF AN IMAGE AND HAVING PIXEL VALUES" 602. In this case, each integral image sum may be associated with a pixel location and a pixel value at the pixel location.

The process 600 also includes an operation to "PLACE DATA ON AT LEAST ONE CACHELINE ACCORDING TO A COMPRESSION SCHEME, WHERE THE DATA COMPRISES AT LEAST ONE INTEGRAL IMAGE SUM, AT LEAST ONE PIXEL VALUE, AND AT LEAST ONE TOTAL OF AT LEAST PART OF A ROW OR COLUMN OF THE PIXEL VALUES FROM THE IMAGE AND INCLUDING AT LEAST ONE PIXEL VALUE IN THE BLOCK OF PIXELS" 604. Thus, while in the usual case the row or column total will include pixel values that extend from the image edge to a location within the pixel block associated with the integral image, in some cases the total row or total column may be part of that extension rather than the entire extension.

The process 600 also includes an operation to GENERATE AT LEAST PART OF THE INTEGRAL IMAGE BASED ON THE COMPRESSION SCHEME" 606. This may be performed by equations like those recited above, and other example equations provided below, to calculate the integral image sums not already provided by the compression scheme.

Referring to FIG. 7, process 600 also includes the situation where both column and row totals are provided in the compression scheme. This may be used, by one example, when the pixel values are stored at 12 bits each instead of 8 bits. In this case, a compression scheme 700 in the form of a bit packing schematic 702 for integral mage 100 may include one integral image sum A0, three row totals RA1 to RA3 stored at 23 bits each, seven column totals CB0 to CH0 stored at 22 bits each, twenty-one pixel values from Pb1 to Ph3 (recited as B[3:1] to H[3:1] referring to the three rows of pixel values 1 to 3 in columns B to H), and 5 bits in reserve totaling 512 bits to fit a single cacheline. In this case, calculating the remaining integral image sums may include using equations in a chain of computations similar to:

$$B0 = A0 + CB0 \quad (12a)$$

$$B1 = RA1 + B0 + Pb1 \quad (12b)$$

$$B2 = RA2 + B1 + Pb2 \quad (13)$$

and so forth. It will be understood that there are many different ways to calculate the integral image sums and this is merely one example.

Referring to FIGS. 8-10, an alternative linear arrangement is provided for an integral image 800 corresponding to a block 802 of pixels (or pixel values or pixel locations) where an upper row 804 includes integral image sums A0 to A15, and a lower row 806 includes integral image sums B0 to B15 for a total of 32 sums or pixel locations. One approach to compress the integral image 800 to a single cache line is to provide a compression scheme 900 with only two integral image sums A0 and B0. An upper row 902 of the compression scheme includes A0 and column totals (of pixel values) CA1 to CA15. As mentioned above, these column totals may each be a total of all or a part of the pixel values in a column from an upper edge of an image to a pixel location in the pixel block 802 corresponding to the integral image 800. In the illustrated form, the pixel locations for the upper row 902 correspond to the upper edge or upper most row 804 of the integral image 800, but as mentioned herein, different pixel locations may be used. The lower row 904 of the compression scheme 900 includes integral image sum B0 and fifteen pixel values PB1 to PB15 as well as reserve 906. This provides for a total of 64 bits used for the two integral image sums, 120 bits for the fifteen pixel values with 8 bits per pixel, and 20 or 21 bits for each of the fifteen column totals CA1 to CA15 and the remaining 13 or 28 bit space 906 packed as reserved bits. This provides 512 bits total to fit a single, two-row cacheline, and the equations similar to that used above may be used here:

$$A1 = A0 + CA1 \quad (14)$$

$$B1 = B0 + CA1 + PB1 \quad (15)$$

...

$$B15 = B14 + CA15 + PB15 \quad (16)$$

and so forth. As will be appreciated, this establishes another chain of computations such that calculating A15 and B15 may require first calculating A1 to A14, or B1 to B14, respectively, and therefore may cause delay.

In order to break the "compute" chain, and reduce the depth of the computational logic and pipeline for decompressing the compressed integral image in hardware, to get back the integral sum at a pixel location, difference values can be inserted into the compression scheme so that calculations can be performed in parallel rather than a single serial chain of computations. For example, alternative compression scheme 1000 for placing integral image 800 on a cacheline includes difference values or difference totals DA8 and DB8 in place of column total CA8 and pixel value PB8. Thus, for compression scheme 1000, an upper row 1002 includes, from left to right in this example, integral image sum A0, column totals CA1 to CA7, difference value DA8, and then the remaining column totals CA9 to CA15. Likewise, the lower row 1004 includes, from left to right, integral image sum B0, pixel values PB1 to PB7, difference value DB8, and then the remaining pixel values PB9 to PB15 as well as reserve 1006. For this compression scheme 1000, the integral image sums A1 to A7 ad B1 to B7 may be calculated as explained above for compression scheme 900. The remaining integral image sums, however, may be calculated by using difference values DA8 and DB8 rather than A0 and B0. Specifically, the difference values are set as:

$$DA8 = A8 - A0 \quad (16)$$

$$DB8 = B8 - B0 \quad (17)$$

so that A8 and B8 can be calculated immediately simply by rearranging equations (16) and (17). Integral image sums A9 to A15 and B9 to B15 are then calculated by using A9 and B9 going forward. For example:

$$A9 = A8 + CA9 \quad (16)$$

$$B9 = B8 + CA9 + PB9 \quad (17)$$

and so forth.

To further simplify, the original integral sum values A8 and B8 may be used instead of differences DA8 and DB8 to reduce the dependency further.

Thus, by this example, it will be understood that the algorithms herein can be extended to provide for more than 2:1 compression depending on the caching, memory, and/or hardware requirements of the system. By one example mentioned above, difference values can be added to provide additional starting points for the calculation of the integral image sums, and reduce the computation delay. By providing the original values A8 and B8, the dependency is decreased since at least some of the equations may be performed in parallel rather than a single, serial chain of computations. To increase the compression ratio better than 2:1, the number of seeds may be decreased, the number of column or row totals may be increased, and/or the area to be compressed may be increased.

For many video coding algorithms, the coding system will read blocks of continuous data. In these cases, more data may be provided on a single cacheline by using the compression schemes herein and decompression is done on the fly by the hardware. The compressed data also helps with video analytics and perceptual computing applications by increasing the efficiency of scatter gather access assuming decompression is done on the fly. The compression reduces the footprint to hold in the cache and hence more hits can be obtained in the cache.

Referring to FIGS. 11-12, a compression scheme 1200 can be made compatible with single instruction multiple data (SIMD) instructions. By one approach, the integral image data placed on the cacheline 1202 is maintained in 8, 16, or 32 bit pieces or blocks of data since SIMD works better with these uniform sizes. Thus, by one example, for compression scheme 1200, at least part of an integral image sum, at least part of a pixel value, and at least part of a column or row total (or difference value) are maintained in 32 bit pieces or blocks 1204 for fitting into one or more cachelines 1202.

More specifically, for this example, an integral image 1100 of 32-bit original integral image sums is provided with two columns A-B and sixteen rows 0 to 15 to correspond to a similarly sized pixel block 1102. This provides a first or left column 1104 of integral image sums A0 to A15, and a second or right column 1106 of integral image sums B0 to B15. Alternatively, integral image 1100 could be provided horizontally in long rows instead. In the present example, the compression scheme 1200 includes the sum of the column of pixels at location B0 and B8 as CB0 and CB8 on compression scheme 1200 to calculate the integral image sums in the column direction and the original values at A0 and A8. This effectively defines the sixteen row integral image 1100 into two compression scheme parts or sections 1206 and 1208. Thus, each section has two-columns by eight-rows (64 bit×8) to produce a compressed surface of 128 bits×two rows on the compression scheme 1200 for a compression of 2:1 for each section 1206 or 1208. This compression can be done for any rectangular shapes, and is not limited to the example mentioned above. Further the compression can be increased to 4:1 or further depending on the rectangular region. The example does not limit the pattern or compression factor but is just an example to show how an integral image can be compressed easily on a SIMD machine. Here, the compression is performed in the vertical/column direction for two columns.

In order to maintain the uniform 32 bit blocks 1204, only one 32 bit integral image sum may be provided for each 8 rows. Thus, here A0 and A8 are provided, and both are separated into eight 4 bit nibbles, each nibble being placed in one of the 32 bit blocks 1204. Each nibble is labeled by the bit numbers it contains so that [3:0] means bits 0 to 3 in a nibble, and so on. It will be understood that many other configurations exist where the integral image sum is scattered as nibbles, and need not always be placed with one nibble to a block 1204. In this example, one 8-bit original pixel value PB0 to PB15 may be placed in each block 1204 as well as one row/column total or difference value. By the illustrated example, 20-bit difference values (or column totals) CB0 and CB8 are placed in the first block locations of each two row section 1206 and 1208 of the compression scheme 1200, and that corresponds to an eight row section of the integral image 1100 as described above. One 20-bit, row total RA1 to RA15 are placed in each of the remaining blocks 1204 as well. Thus, 32 bits are obtained (4 bit nibble+8 bit pixel value+20 bit row/column total). The row and column totals are the same as that described previously to include the sum of pixel values from outside the pixel block, if any, and to and including the pixel value at the pixel location of the row or column total. It is noted that the column totals CB0 and CB8 may be calculated as difference values between the A and B columns. Thus, for example:

$$CB0=B0-A0 \quad (18)$$

$$CB8=B8-A8 \quad (19)$$

since the integral image sum up to, or through, the A column plus the column of pixels in the B column equals the integral image sum in the B column. Otherwise, of course, the column total CB0 or CB8 may be calculated by adding the column of pixel values above, and at pixel location B0 and B8.

Figure 13:
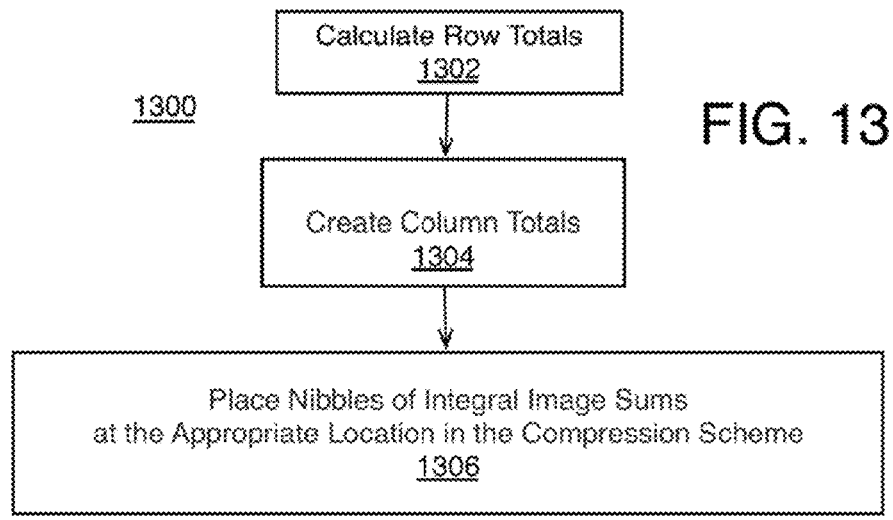
FIG. 13 is a flow chart illustrating an example process.

Referring to FIG. 13, compression of an integral image, such as integral image 1100, using compression scheme 1200 according to one example process 1300, may be arranged in accordance with at least some implementations of the present disclosure. In general, process 1300 may provide a computer-implemented method for integral image coding. In the illustrated implementation, process 1300 may include one or more operations, functions or actions as illustrated by one or more of actions 1302, 1304, and/or 1306. By way of non-limiting example, process 1300 will be described herein with reference to operations discussed with respect to FIGS. 11-12 above and example system 1700 discussed below.

Process 1300 may be used to compress an integral image for placement on one or more cachelines for later decompression upon a cache hit, or otherwise when needed. Process 1300 may include a routine to calculate 1302 row totals such as RA1 to RA15 on compression scheme 1200. One example pseudo code for providing this operation follows below. The following pseudo code shows SIMD implementation for compression once the integral image is created. Otherwise, compression can be performed while generating the integral image so that duplicative data write and read backs from memory may be avoided. Alternatively, this can be implemented in hardware to compress an integral image on the fly. The integral image can be created by either the CPU or GPU and there can be a compressor (such as, for instance, part of an integral image control or module, which can be an integral image logic unit for any of the examples herein), and which would collect two or more cachelines, and combine them to create the compressed integral image before writing it to memory. When reading the integral image a decompressor (which also may be part of the integral image module or logic unit) could be used to decompress this integral image before giving the data to the processing unit. The decompression can happen at various levels depending on usage and where the actual integral image data is required to be used.

From the monochrome image (for example, luminance values) used for creating the integral image, the row totals (RA1-RA15 for example) located on a column of pixels may be obtained row by row as shown below. It will be understood that a similar routine to find column totals in addition, or instead, of the row totals may be used.

```
//for all j, RSUM[j,0] is initialized to 0
For j = 0...Height/W
    For i = 0...Width
        For SIMD = 0...(W-1) {
            K = i -1
            If K < 0, K = 0
            RSUM[j+SIMD,i] = RSUM[j+SIMD,K] + IN[j+SIMD,i]
            //W rows are done in SIMD
            //RSUM is a maximum of 20 bits but stored as 32 bit values
        }
``` where:
W is SIMD width (or width of processing, such as four rows at a time for example), assumed to be an even number,
i*j is the number of independent processing elements that are working to complete the row sum for the complete image,
Width is the width of the Image,
Height is the height of the image,
IN is the input, and
RSUM is the row total of pixel values, which is the output for operation 302.

The process 1300 may also include a routine to create 1304 the final integral image sums (such as A0 and A8 on FIG. 12 for example), represented below as 'SUM'

```
//for all j, SUM[j,0] is initialized to 0
For i = 0...Width/W
    For j = 0...Height {
        For SIMD = 0...(W-1) {
            K = i -1
            If K < 0, K = 0
            SUM[j, i+SIMD] = SUM[j, K+SIMD] + RSUM[j, i+SIMD]
            //W rows are completed in SIMD.
        }
```

The process 1300 may also include a routine to create the compressed integral image and place 1306 the nibbles of the integral image sums at the appropriate place in the compression scheme

```
If(MOD(j/8) == 0) {
    For M = 0...(W/2 - 1){
        N = i + M*2
        Temp1 = SUM[j,N]
        For SIMD = 0...(W-1) {
            Out[SIMD] = RSUM[j+SIMD,N]
            Out[SIMD] |= (IN[j+SIMD,N+1] << 20)
            Out[SIMD] |= Temp1 << 28
            Temp1 = Temp1 >> 4
        }
        For SIMD = 0...(W/2-1)
            Compressed_Integral_Image[j/4, i+M*4+SIMD] =
            Out[SIMD]
        For SIMD = W/2...(W-1)
            Compressed_Integral_Image[j/4+1,
            i+M*4+(SIMD-W/2)]= Out[SIMD]
    }
  }
}
```

The reverse operation can be performed for decompression of the compression scheme that is compatible with SIMD. It will be understood that a similar coding or routines may be used with any of the compression schemes described above or compression schemes that are similar, and that any of the routines provided herein may be used alone or in combination with other routines as needed. Thus, for example, where a compression scheme only uses row totals, the routine to determine the row totals from above may be used alone. Likewise, a routine for creating the final integral image sums, and/or the routine for placing the nibbles in the compression scheme, may be used alone or with any of the other routines.

Example decompression pseudo-code may be as follows for generating the integral image 1100 from the two 2×8 pixel location sections 1206 or 1208 provided by the compression scheme 1200, where:

A0=A0//collect the spread-out A0 bits and pack them together to get the 32 bit A0 value, then $$A1 = A0 + RA1 \quad (20)$$

$$A2 = A1 + RA2 \quad (21)$$

$$A3 = A2 + RA3 \quad (22)$$

$$A4 = A3 + RA4 \quad (23)$$

$$A5 = A4 + RA5 \quad (24)$$

$$A6 = A5 + RA6 \quad (25)$$

$$A7 = A6 + RA7 \quad (26)$$

$$A8 = A8 \quad (27)$$

$$A9 = A8 + RA9 \quad (28)$$

$$...$$

$$A15 = A14 + RA15 \quad (29)$$

$$B0 = A0 + CB0 \quad (30)$$

$$B1 = A1 + CB0 + PB1 \quad (31)$$

$$B2 = A2 + CB0 + PB2 \quad (32)$$

$$B3 = A3 + CB0 + PB3 \quad (33)$$

$$B4 = A4 + CB0 + PB4 \quad (34)$$

$$B5 = A5 + CB0 + PB5 \quad (35)$$

$$B6 = A6 + CB0 + PB6 \quad (36)$$

$$B7 = A7 + CB0 + PB7 \quad (37)$$

A8=A8//collect the spread-out A8 nibbles and pack them together to get the 32 bit A8 value, then $$B8 = A8 + CB8 \quad (38)$$

$$B9 = A9 + CB8 + PB9 \quad (39)$$

$$...$$

$$B15 = A15 + CB8 + PB15 \quad (40)$$

It will be understood that modifications or different equations may be used that provide the same or similar result, or that may provide fewer or more calculations to get to the results.

Different SIMD compliant compression layouts or schemes may be used to enable General Purpose computing with a Graphics Processor Unit (GPGPU), a type of SIMD machine, and to create and process the integral image data. This includes the above compression layout 1200 corresponding to 2-wide by 8-high pixel blocks or section 1106 and 1108 of integral image 1100.

Figure 15:
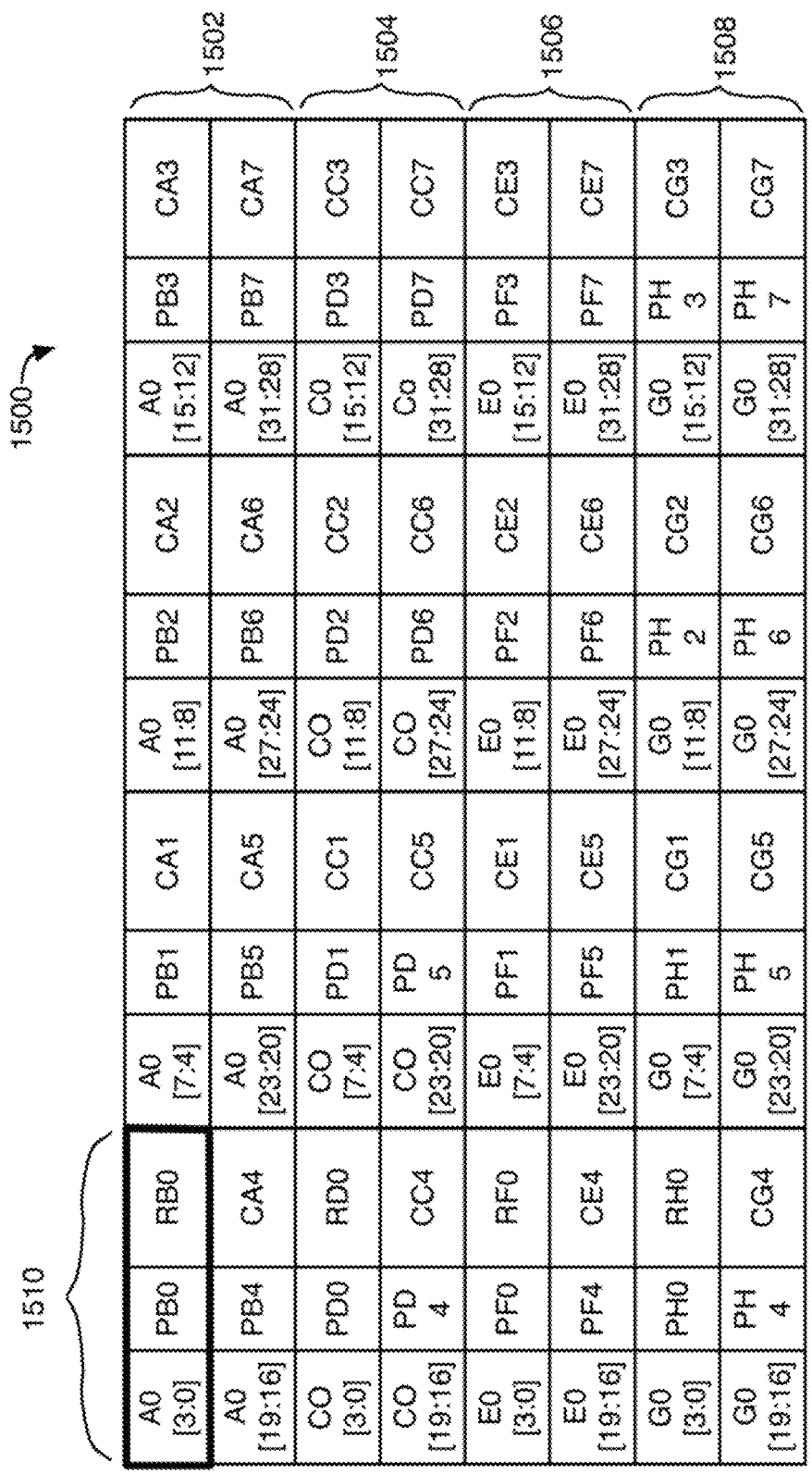
FIG. 15 is an illustrative diagram showing another example compression layout compatible with single instruction multiple data (SIMD) processing for the integral image of FIG. 14.

Referring to FIGS. 14-15, another example to obtain 2:1 compression for an 8-wide by 2 high pixel block or section 1404 of an integral image 1400 may be provided by compression scheme 1500. Integral image 1400 corresponds to an 8×8 pixel block 1402, and includes rows A to H and columns 0 to 7 providing 64 integral image sums at 32 bits each. Integral image 1400 can be divided into four sections 1404, 1406, 1408, and 1410, where each section includes two rows or two columns of integral image sums (2×8 block of pixel locations) totaling 512 bits. Each section may be coded to the compression scheme 1500 by using at least one, and here just one, base or seed integral image sum per section to initiate a chain of computations to calculate a number of integral image sums similar to compression scheme 1200.

More specifically, compression scheme 1500 has four sections 1502, 1504, 1506, and 1508, each section with two rows of values, and by one approach, eight 32 bit pieces or blocks 1510 as with 32 bit blocks 1204 of compression scheme 1200. Similar to the blocks 1204, the 32 bit blocks 1510 here also may include a 4 bit nibble of a separated piece of an integral image sum (A0, C0, E0, or G0 in the present example) and as explained above for compression scheme 1200, an 8 bit pixel value PB0 to PH7, and a 20 bit row or column total. In the present example, each section 1502, 1504, 1506, and 1508 may have one row total (RB0, RD0, RF0, or RH0 respectively) but otherwise may have seven column totals (CA1-CA7, CC1-CC7, CE1-CE7, and CG1 to CG7 respectively). Here, however, compression scheme 1500 is horizontally oriented rather than vertically oriented. So configured, for forming the section 1502 on compression scheme 1500 for example, the upper row of each integral image section, such as section 1404, may be associated with, or represented on the compression scheme by, the integral image sum for the first, left, pixel location (such as A0 for section 1404), and column totals along the rest of the row (CA1 to CA7). The lower row of each section may have a row total (such as RB0 for section

1404) for the first, left pixel location B0, and the pixel values (PB1 to PB7) for the remainder of the lower row.

The proposed compression schemes 1200 and 1500 are easier to implement using a SIMD machine with maximum utilization. Other compressed images described previously can still be implemented using SIMD machine though it may not be the most efficient utilization of the SIMD processing unit. The proposed scheme is also more symmetric than other mentioned methods. If other cores which use a single instruction and single data processing element are also used to create the compressed integral image, then any of the schemes mentioned above can be used. Alternatively, hardware could be used to create the compressed integral image, using the integral image data being written out to memory. This can be done on the fly while the CPU or GPU or other processing unit is creating the integral image. The hardware will collect this integral image data and compress the same before writing the data into the compressed integral image. This way, the CPU or GPU or processing unit does not even need to be aware that the compressed integral image exists in the system memory for both reads or writes to the integral image.

Figure 16:
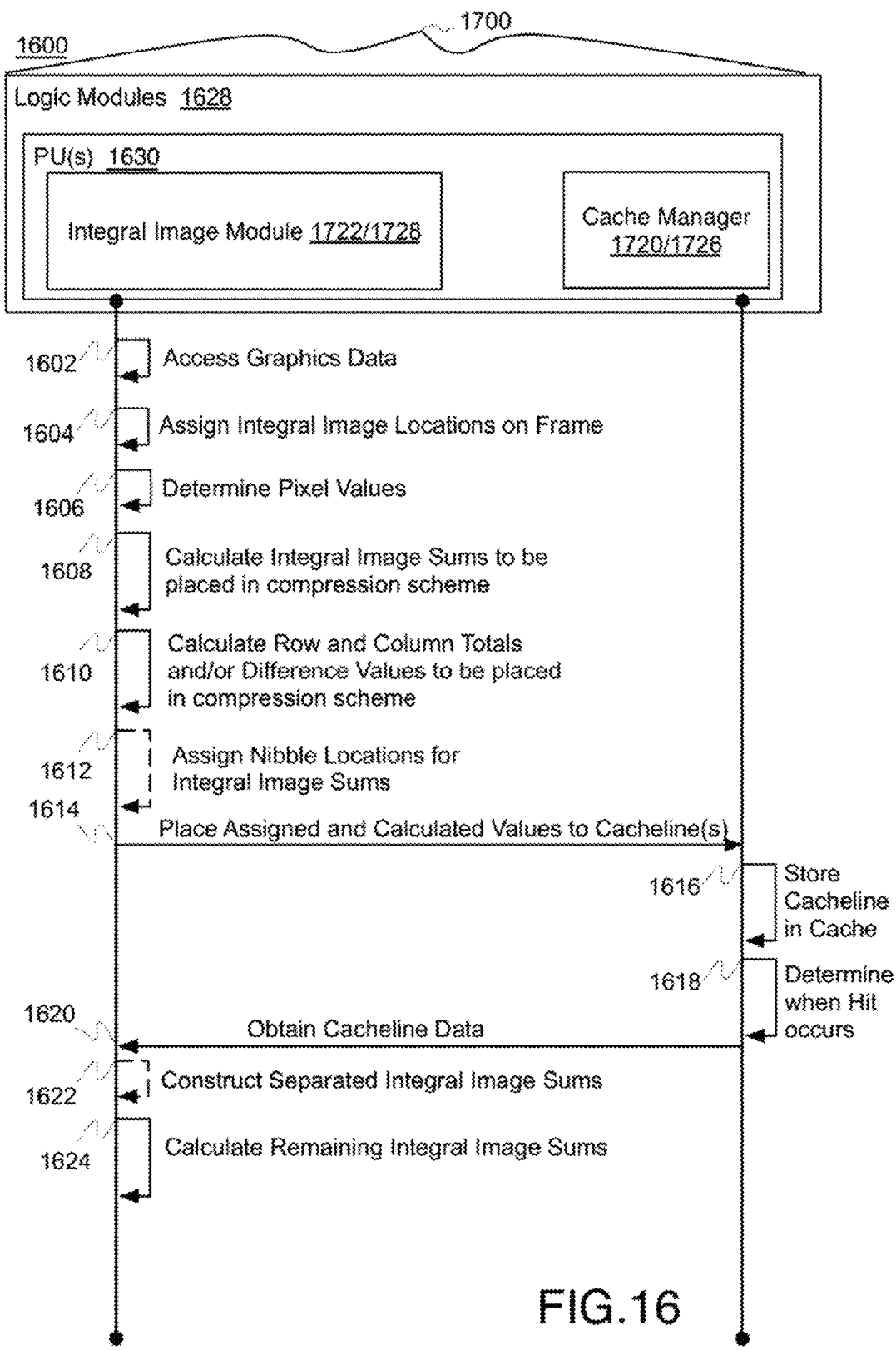
FIG. 16 is an illustrative diagram of an example system in operation for providing compression and/or decompression for an integral image.

Referring to FIG. 16, system 1700 may be used for an example integral image coding process 1600 shown in operation, and arranged in accordance with at least some implementations of the present disclosure. In general, process 1600 may provide a computer-implemented method for integral image coding. In the illustrated implementation, process 1600 may include one or more operations, functions, or actions as illustrated by one or more of actions 1602 to 1624 numbered evenly, and used alternatively or in any combination. By way of non-limiting example, process 1600 will be described herein with reference to operations discussed with respect to any of FIGS. 1-15 above and example system 1700 discussed below.

Figure 17:
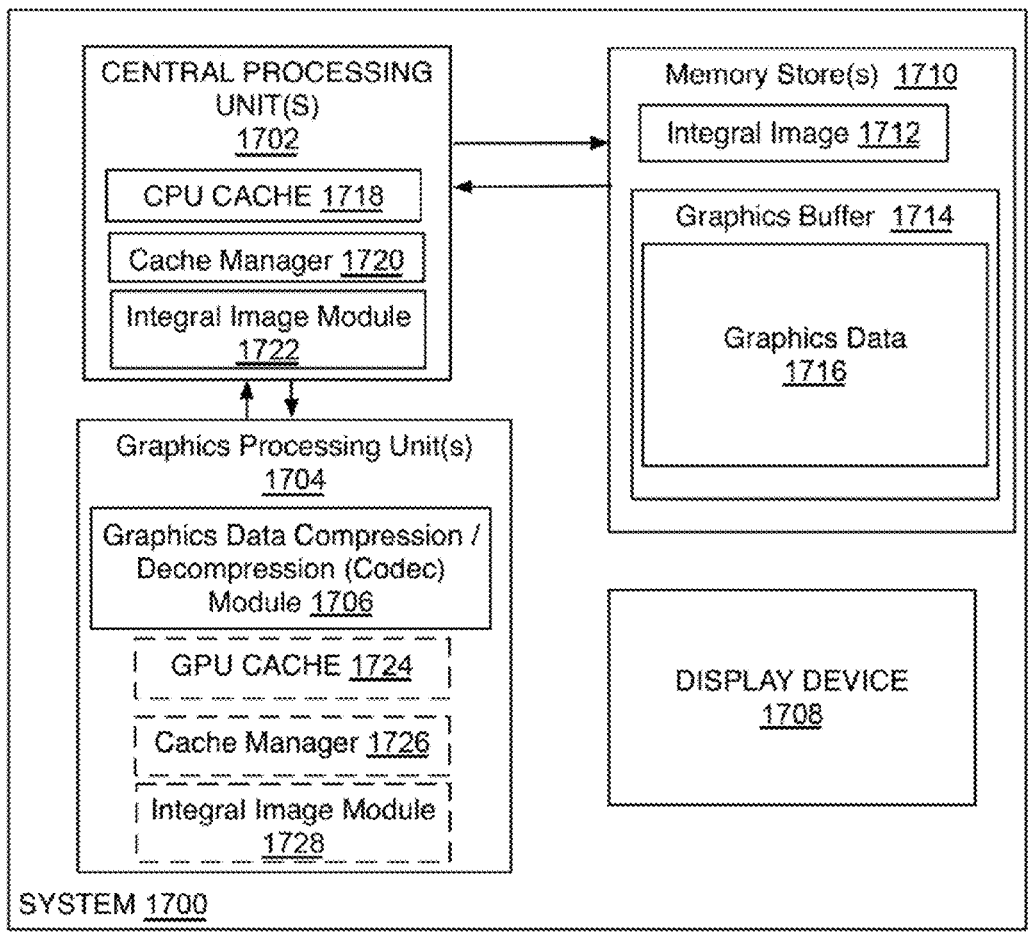
FIG. 17 is an illustrative diagram of an example system.

In the illustrated implementation, system 1700 may include logic units or logic modules 1628, the like, and/or combinations thereof. For one example, logic modules 1628 may include a processing unit 1630 that may correspond to central processing unit (CPU) 1702 or graphics processing unit (GPU) 1704, for example. The processing unit 1630 may include an integral image module, which may correspond to logic units or logic modules 1722 or 1728, and a cache manager which may correspond to manager 1720 or 1726. Although system 1700, as shown in FIG. 17, may include one particular set of operations or actions associated with particular modules, these operations or actions may be associated with different modules than the particular module illustrated here. Although process 1600, as illustrated, is directed to compression and decompression of an integral image, the concepts and/or operations described may be applied to compression or decompression separately.

Process 1600 may include "ACCESS GRAPHICS DATA" 1602, where the system may obtain access to pixel data of a video or picture frame that will be analyzed. The data may be obtained or read from RAM or ROM, or from another permanent or temporary memory, memory drive, or library. The access may be continuous access for analysis of an ongoing video stream for example.

Process 1600 may continue with "ASSIGN INTEGRAL IMAGE LOCATIONS ON A FRAME" 1604. Here, by one form, a single integral image is provided for an entire frame. For certain tasks, the entire integral image may be compressed for transmission to a memory. In this case, the entire integral image may be divided into smaller integral image portions for transmission and storage in one or more cachelines for each of the integral image portions. In one case, the small integral images may be set at one uniform size, such as 8×8 or 4×8 pixel locations, for an entire frame, or an entire scene, sequence, or video. Otherwise, the integral images may be different sizes depending on the frame parameters such as the frame size or resolution.

Alternatively, when a video coding system, for example, is detecting objects in an image (or frame), the system may have instructions to provide an integral image for one or more of the detected objects. In this case, the system may define pixel blocks that correspond to the desired integral images, or more accurately integral image portions, where a whole frame has a single entire integral image. In this case, the size of the integral image may be chosen depending on the size of the detected object on the image, such as a detected face or detected motion of an arm. In these cases, the integral image may be a size to correspond to the size of the object, detection rectangle, or box encircling the object on the image or frame. The integral image size also may be different depending on the media type of the frame such as still picture versus video. Many other examples are contemplated.

Process 1600 may continue with "DETERMINE PIXEL VALUES" 1606. Thus, once the locations of the integral images are set, the pixel values of the frame are obtained in order to use them to calculate integral image sums as well as row or column totals as needed. The pixel values to be place onto the cacheline according to the compression scheme are also obtained.

It will be understood that the compression scheme may be set for all integral image coding, or there may be a selection of different compression schemes used depending on the size/resolution of the integral image or other factors such as a desired compression ratio (for example, 2:1 or 4:1). This selection, if provided, may be performed automatically or adjusted by a user.

Process 1600 may then include "CALCULATE INTEGRAL IMAGE SUMS TO BE PLACED IN COMPRESSION SCHEME" 1608. Here, the pixel values of the frame are used to calculate at least the integral image sums to be placed in the cacheline(s) according to the compression scheme. This may be one integral image sum per every 2×8 pixel locations as provided on compression scheme 1200 and 1500 described above as one example. Other examples above use two integral image sums (compression scheme 900), or even a row of eight integral image sums (compression scheme 200 or 300) instead. By other approaches, there is at least one integral image sum in the compression scheme, and by another approach, there is at least one integral image sum for each cacheline. Alternatively, one integral image sum may be provided for multiple cachelines either by having the integral image sum in one cacheline or by having the same integral image copied into, or separate into nibbles for example, over multiple cachelines.

Process 1600 may continue with "CALCULATE ROW AND COLUMN TOTALS AND/OR DIFFERENCE VALUES TO BE PLACED IN COMPRESSION SCHEME" 1610. The calculation of row and column totals may proceed as with process 1300 described above, and using the pixel values already obtained. Difference values such as DA8 and DB8 for compression scheme 1000 also may be calculated.

When the compression scheme is compatible with SIMD, the process 1600 may continue with "ASSIGN NIBBLE LOCATIONS FOR INTEGRAL IMAGE SUMS" 1612. This may include separating integral image sums into nibbles, such as 4 bit nibbles, and then assigning the nibbles to certain locations on the compression scheme according to the process 1300.

Process 1600 may continue with "PLACE ASSIGNED AND CALCULATED VALUES TO CACHELINE(S)"

1614, and according to the compression scheme, and then "STORE CACHELINE IN CACHE" 1616 by the cache manager for example. It will be understood, however, and as mentioned herein, that the cachelines may be stored at a main memory or other types of memory other than cache.

The process may then "DETERMINE WHEN HIT OCCURS" 1618 on the integral image stored in cache for example, and once a cache hit occurs, the integral image module may "OBTAIN CACHELINE DATA" 1620 that is stored in accordance with the compression scheme. Alternatively, it will be understood that the compressed cachelines may be obtained from other types of memory, other than a cache memory, when the system wants to use the integral image. Either way, this may include obtaining data for a compressed entire integral image, or may include obtaining only small integral images (or in other words portions of an entire integral image), or both.

Process 1600 may continue with "CONSTRUCT SEPARATED INTEGRAL IMAGE SUMS" 1622, when the integral image sums have been separated into nibbles for SIMD compatibility for instance.

Once the initial (or base or seed) integral image sums are obtained, the process 1600 may continue with "CALCULATE REMAINING INTEGRAL IMAGE SUMS" 1624 to fill in the rest of the integral image. The equations may be the same or similar to those provided above, and may be a single chain of computations to serially perform the computations, or may have difference values or interior column or row totals so that different parts of an integral image may be computed in parallel as explained above.

In general, process 1600 may be repeated any number of times either in serial or in parallel, as needed. Furthermore, in general, logic units or logic modules, such as integral image module 1722 or 1728 may be implemented, at least in part, hardware, software, firmware, or any combination thereof. As shown, in some implementations, integral image module 1722/1728 may be implemented via processing unit(s) 1630. In other implementations, integral image module 1722/1728 may be implemented via hardware or software implemented via one or more central processing unit(s). In general, integral image module 1722/1728 and/or the operations discussed herein may be enabled or enabled at a system level. Some parts, however, for controlling the type of compression scheme or compression ratio used, may be provided or adjusted at a user level, for example.

While implementation of example process 600, 1300, or 1600 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

Referring to FIG. 17, an example system 1700 for providing integral image coding for cache memory may be arranged in accordance with at least some implementations of the present disclosure. In the illustrated implementation, system 1700 may include one or more central processing units 1702, and one or more graphics processing units 1704 with, for one example, a graphics data compression/decompression (codec) module 1706, a display device 1708, and one or more memory stores 1710. Central processing units 1702, memory store 1710, graphics processing units 1704, and/or display device 1708 may be capable of communication with one another, via, for example, a bus, wires, or other access. In various implementations, display device 1708 may be integrated in system 1700 or implemented separately from system 1700.

As shown in FIG. 17, and discussed above, the central processing unit 1702 may have a CPU cache 1718 and a cache manager 1720 to control the memory transactions to and from the cache and the data storage at the cache. Alternatively, or additionally, the graphics processing unit 1704 may also have a cache 1724 with a cache manager 1726 to control the cache 1724. Otherwise, the cache may be provided in other locations on the system, which can be near to the memory but not local to the CPU or GPU. It will be understood by some alternative examples, the cachelines described herein are provided to memories other than the cache 1724 or 1728, and may even be provided in systems that do not have a cache. Either the central processing unit 1702 or the graphics processing unit 1704 or both may have an integral image module 1722 or 1728 to provide many of the functions described herein and as explained with processes 600, 1300, and 1600.

In general, memory stores 1710 may store the integral images 1712 and may also have a graphics buffer 1714 communicatively coupled to graphics processing unit 1704, which may be accessed by graphics data codec module 1706 and integral image module 1728 to retrieve graphics data 1716. Furthermore, display device 1708 may be configured to display output image data based at least in part on graphics data 1716. As discussed herein, integral image module 1722 or 1728 may be configured to access integral image 1712 and/or graphics data 1716 to generate integral image sums, construct one or more cachelines according to a compression scheme, and then decompress the cacheline data to construct an integral image as discussed herein.

As will be appreciated, the modules illustrated in FIG. 17 may include a variety of software and/or hardware modules and/or modules that may be implemented via software or hardware or combinations thereof. For example, the modules may be implemented as software via central processing units 1702 and/or graphics processing units 1704 or the modules may be implemented via a dedicated hardware portion or portions of graphics processing units 1704. Furthermore, the shown memory stores 1710 may be shared memory for central processing units 1702 and/or graphics processing units 1704, for example. Furthermore, graphics buffer 1714 may be implemented via memory stores 1710 or separately from memory stores 1710 and/or graphics buffer 1714 may be implemented via a general buffer that may include other buffer portions such as a render buffer, or the like. Integral image 1712 may be stored on any of the options mentioned above, or may be stored on a combination of these options, or may be stored elsewhere. Also, system 1700 may be implemented in a variety of ways. For example, system 1700 (excluding display device 1708) may be implemented as a single chip or device having a graphics processor, a quad-core central processing unit, a memory controller input/output (I/O) module. In other examples, system 1700 (again excluding display device 1708) may be implemented as a chipset.

Central processing units 1702 may include any suitable implementation including, for example, microprocessor(s), multicore processors, application specific integrated circuits, chip(s), chipsets, or the like. Furthermore, graphics processing units 1704 may include any suitable implementation including, for example, processor(s), multicore processors, application specific integrated circuits, programmable logic devices, graphics cards, integrated graphics, general purpose graphics processing unit(s), or the like. In addition, memory stores 1710 and/or graphics buffer 1714 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1710 and/or graphics buffer 1714 also may be implemented via cache memory. In various examples, system 1700 may be implemented as a chipset or as a system on a chip.

The system can contain caches like 1718 or 1724 which are part of a CPU or GPU, or can be a common cache near to system memory 1710 or any other place at the system 1700.

Figure 18:
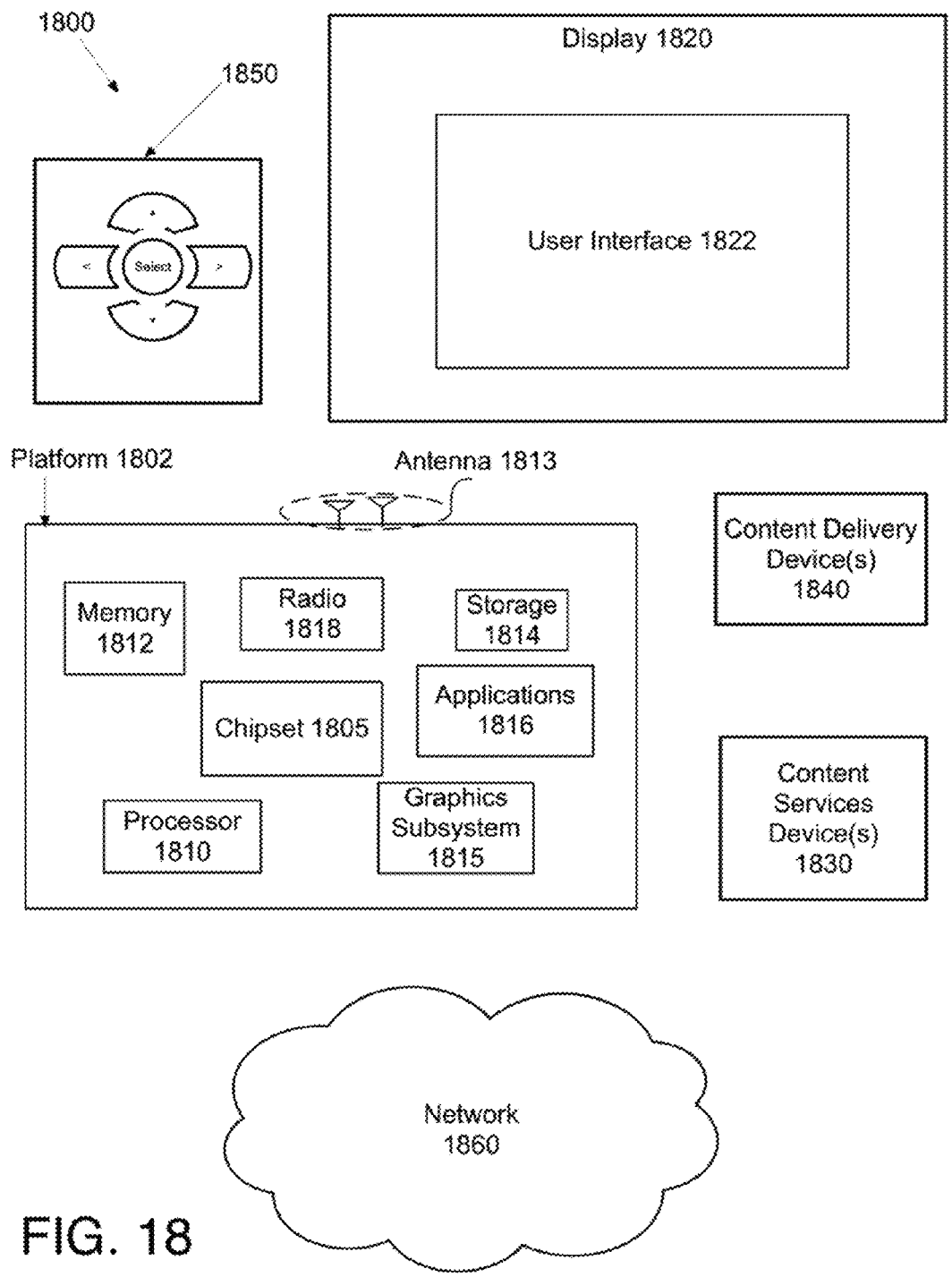
FIG. 18 is an illustrative diagram of another example system.

Referring to FIG. 18, an example system 1800 in accordance with the present disclosure and various implementations, may be a media system although system 1800 is not limited to this context. For example, system 1800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1800 includes a platform 1802 communicatively coupled to a display 1820. Platform 1802 may receive content from a content device such as content services device(s) 1830 or content delivery device(s) 1840 or other similar content sources. A navigation controller 1850 including one or more navigation features may be used to interact with, for example, platform 1802 and/or display 1820. Each of these components is described in greater detail below.

In various implementations, platform 1802 may include any combination of a chipset 1805, processor 1810, memory 1812, storage 1814, graphics subsystem 1815, applications 1816 and/or radio 1818. Chipset 1805 may provide intercommunication among processor 1810, memory 1812, storage 1814, graphics subsystem 1815, applications 1816 and/or radio 1818. For example, chipset 1805 may include a storage adapter (not depicted) capable of providing intercommunication with storage 1814.

Processor 1810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1810 may be dual-core processor(s), dual-core mobile processor(s), and so forth.

Memory 1812 may be implemented as a volatile memory device such as, but not limited to, a Random Access Memory (RAM), Dynamic Random Access Memory (DRAM), or Static RAM (SRAM).

Storage 1814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1814 may include technology to increase the storage performance enhanced protection for valuable digital media when multiple hard drives are included, for example.

Graphics subsystem 1815 may perform processing of images such as still or video for display. Graphics subsystem 1815 may be a graphics processing unit (GPU) or a visual processing unit (VPU), for example. An analog or digital interface may be used to communicatively couple graphics subsystem 1815 and display 1820. For example, the interface may be any of a High-Definition Multimedia Interface, Display Port, wireless HDMI, and/or wireless HD compliant techniques. Graphics subsystem 1815 may be integrated into processor 1810 or chipset 1805. In some implementations, graphics subsystem 1815 may be a stand-alone card communicatively coupled to chipset 1805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multicore processor. In other implementations, the functions may be implemented in a consumer electronics device.

Radio 1818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1818 may operate in accordance with one or more applicable standards in any version.

In various implementations, display 1820 may include any television type monitor or display. Display 1820 may include, for example, a computer display screen, touch screen display, video monitor, television-like device, and/or a television. Display 1820 may be digital and/or analog. In various implementations, display 1820 may be a holographic display. Also, display 1820 may be a transparent surface that may receive a visual projection. Such projections may convey various forms of information, images, and/or objects. For example, such projections may be a visual overlay for a mobile augmented reality (MAR) application. Under the control of one or more software applications 1816, platform 1802 may display user interface 1822 on display 1820.

In various implementations, content services device(s) 1830 may be hosted by any national, international and/or independent service and thus accessible to platform 1802 via the Internet, for example. Content services device(s) 1830 may be coupled to platform 1802 and/or to display 1820. Platform 1802 and/or content services device(s) 1830 may be coupled to a network 1860 to communicate (e.g., send and/or receive) media information to and from network 1860. Content delivery device(s) 1840 also may be coupled to platform 1802 and/or to display 1820.

In various implementations, content services device(s) 1830 may include a cable television box, personal computer, network, telephone, Internet enabled devices or appliance capable of delivering digital information and/or content, and any other similar device capable of unidirectionally or bidirectionally communicating content between content providers and platform 1802 and/or display 1820, via network 1860 or directly. It will be appreciated that the content may be communicated unidirectionally and/or bidirectionally to and from any one of the components in system 1800 and a content provider via network 1860. Examples of content may include any media information including, for example, video, music, medical and gaming information, and so forth.

Content services device(s) 1830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1802 may receive control signals from navigation controller 1850 having one or more navigation features. The navigation features of controller 1850 may be used to interact with user interface 1822, for example. In implementations, navigation controller 1850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1850 may be replicated on a display (e.g., display 1820) by movements of a pointer, cursor, focus ring, or other visual indicators displayed on the display. For example, under the control of software applications 1816, the navigation features located on navigation controller 1850 may be mapped to virtual navigation features displayed on user interface 1822, for example. In implementations, controller 1850 may not be a separate component but may be integrated into platform 1802 and/or display 1820. The present disclosure, however, is not limited to the elements or in the context shown or described herein.

In various implementations, drivers (not shown) may include technology to enable users to instantly turn on and off platform 1802 like a television with the touch of a button after initial boot-up, when enabled, for example. Program logic may allow platform 1802 to stream content to media adaptors or other content services device(s) 1830 or content delivery device(s) 1840 even when the platform is turned "off." In addition, chipset 1805 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1800 may be integrated. For example, platform 1802 and content services device(s) 1830 may be integrated, or platform 1802 and content delivery device(s) 1840 may be integrated, or platform 1802, content services device(s) 1830, and content delivery device(s) 1840 may be integrated, for example. In various implementations, platform 1802 and display 1820 may be an integrated unit. Display 1820 and content service device(s) 1830 may be integrated, or display 1820 and content delivery device(s) 1840 may be integrated, for example. These examples are not meant to limit the present disclosure.

In various implementations, system 1800 may be implemented as a wireless system, a wired system, or a combination of both. When implemented as a wireless system, system 1800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 18.

Figure 19:
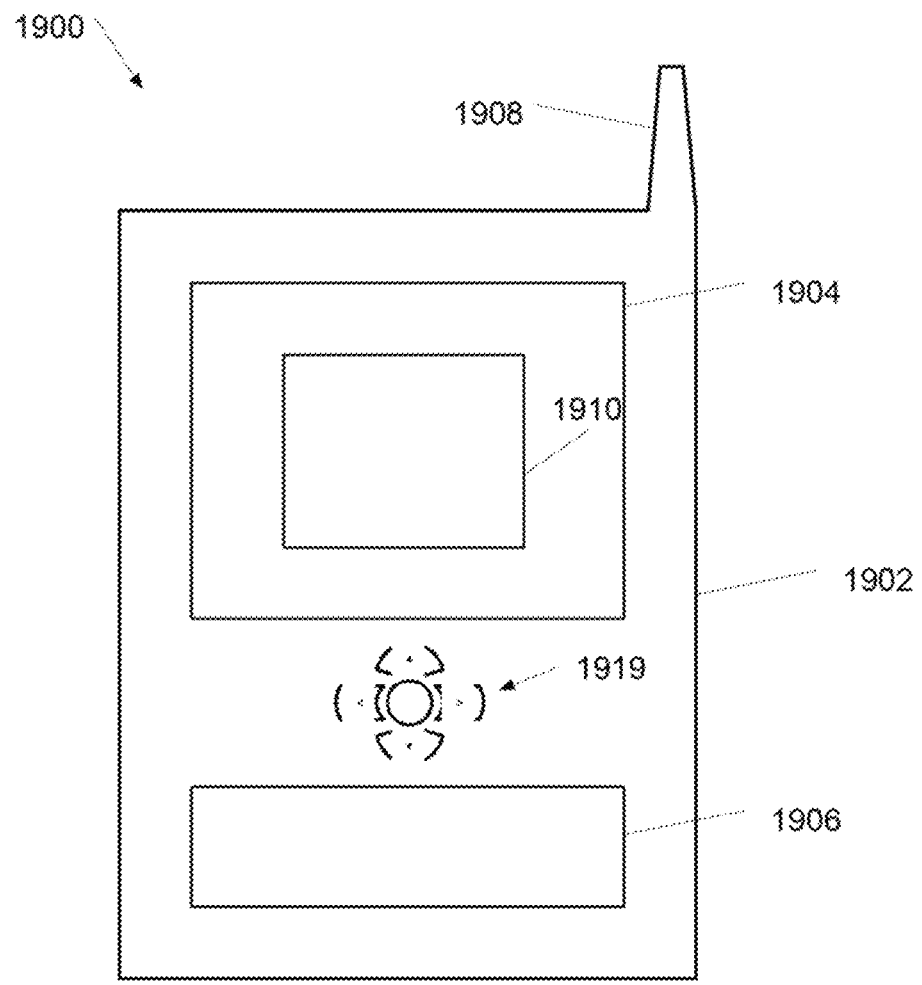
FIG. 19 illustrates another example device, all arranged in accordance with at least some implementations of the present disclosure.

As described above, system 1700 or 1800 may be implemented in varying physical styles or form factors. FIG. 19 illustrates implementations of a small form factor device 1900 in which system 1700 or 1800 may be implemented. In implementations, for example, device 1800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 19, device 1900 may include a housing 1902, a display 1904, an input/output (I/O) device 1906, and an antenna 1908. Device 1900 also may include navigation features 1912. Display 1904 may include any suitable display unit for displaying information appropriate for a mobile computing device. I/O device 1906 may include any suitable I/O device for entering information into a mobile computing device. Examples for I/O device 1906 may include an alphanumeric keyboard, a numeric keypad, a touch pad, input keys, buttons, switches, rocker switches, microphones, speakers, voice recognition device and software, and so forth. Information also may be entered into device 1900 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A computer-implemented method for integral image coding comprises establishing at least one integral image sum of an integral image associated with a block of pixels of an image and having pixel values. Each integral image sum is associated with a pixel location and a pixel value at the pixel location. The method also includes placing data on at least one cacheline according to a compression scheme. The data comprises at least one integral image sum, at least one pixel value, and at least one total of at least part of a row or column of the pixel values from the image and including at least one pixel value in the block of pixels. The method may continue with generating at least part of the integral image based on the compression scheme.

By other approaches, the at least one total of at least part of a row or column comprises at least one of: pixel values extending from an edge of the image and to a pixel location within the block of pixels, pixel values extending in a direction from an edge of the image and to a pixel value within the block of pixels and along a row or column forming an edge of the block of pixels, the total of a row of pixels from the left-most pixel value of the image to the left-most pixel value in the block of pixels along the same row, and the total of a column of pixels from the upper-most pixel value of the image to the upper-most pixel value in the block of pixel data and along the same column.

Otherwise, the method comprises placing the compression scheme on less cachelines than the minimum number of cachelines needed to transmit all of the integral image sums of the integral image, where the compression scheme comprises using a single 64 byte cacheline to transmit data to reconstruct a 128 byte integral image, where the integral image comprises thirty-two integral image sums using 32 bits per sum, and where the compression scheme comprises using at least one of:

(A) a compression scheme having:
(1) eight integral image sums,
(2) twenty-four or twenty-one pixel values at 8 bits per pixel value, and
(3) three row totals or three column totals, and
(B) a compression scheme having:
(1) two integral image sums,
(2) fifteen pixel values, and
(3) fifteen totals of a row of pixel values or fifteen totals of a column of pixel values.

By other approaches, 19-24 bits are reserved for each of the three row totals or three column totals, or the three row totals or three column totals are 21 or 24 bits each. The pixel values are luminance values, and the compression scheme comprises both at least one total of a row of pixel values and at least one total of a column of pixel values.

The method may also include at least one of: the non-integral image sum values in the compression scheme use less than 32 bits each, and the compression scheme comprises reserving less than 32 bits for each row or column total of pixel values in the compression scheme. Also, the compression scheme comprises a difference value that is the difference between a first integral image sum disposed along an edge of the integral image and an intermediate integral image sum spaced inward from, and along a same row or column as, the first integral image sum, and where the difference value is used to reconstruct the integral image.

Otherwise, the compression scheme recites one integral image sum for at least sixteen pixel locations, the compression scheme comprises arranging at least part of an integral image sum, at least part of a pixel value, and at least part of a total of a row or column of pixel values to equal 32 bits, and the integral image sum is separated into a plurality of nibbles or bit pieces.

By another aspect, a system for integral image coding comprises at least one display, at least one processing unit communicatively coupled to the display, at least one cache memory communicatively coupled to the processing unit and configured for receiving and storing cachelines, at least one main memory communicatively coupled to the at least one processor, and an integral image module of the at least one processing unit configured to code an integral image onto or from at least one cacheline.

The integral image module may be configured to establish at least one integral image sum of an integral image associated with a block of pixels of an image and having pixel values. Each integral image sum is associated with a pixel location and a pixel value at the pixel location. The module also is configured to place data on at least one cacheline according to a compression scheme. The data comprises at least one integral image sum, at least one pixel value, and at least one total of at least part of a row or column of the pixel values from the image and including at least one pixel value in the block of pixels. The module may proceed to generate at least part of the integral image based on the compression scheme.

By other approaches, the at least one total of at least part of a row or column provided by the integral image module comprises at least one of: pixel values extending from an edge of the image and to a pixel location within the block of pixels, pixel values extending in a direction from an edge of the image and to a pixel value within the block of pixels and along a row or column forming an edge of the block of pixels, the total of a row of pixels from the left-most pixel value of the image to the left-most pixel value in the block of pixels along the same row, and the total of a column of pixels from the upper-most pixel value of the image to the upper-most pixel value in the block of pixel data and along the same column.

Otherwise, the integral image module may be configured to place the compression scheme on less cachelines than the minimum number of cachelines needed to transmit all of the integral image sums of the integral image, where the compression scheme comprises using a single 64 byte cacheline to transmit data to reconstruct a 128 byte integral image, where the integral image comprises thirty-two integral image sums using 32 bits per sum, and where the compression scheme comprises using at least one of:

(A) a compression scheme having:
(1) eight integral image sums,
(2) twenty-four or twenty-one pixel values at 8 bits per pixel value, and
(3) three row totals or three column totals, and
(B) a compression scheme having:
(1) two integral image sums,
(2) fifteen pixel values, and
(3) fifteen totals of a row of pixel values or fifteen totals of a column of pixel values.

By other approaches, 19-24 bits are reserved for each of the three row totals or three column totals, or the three row totals or three column totals are 21 or 24 bits each. The pixel values are luminance values, and the compression scheme comprises both at least one total of a row of pixel values and at least one total of a column of pixel values.

The integral image module may also include at least one of: the non-integral image sum values in the compression scheme use less than 32 bits each, and the compression scheme comprises reserving less than 32 bits for each row or column total of pixel values in the compression scheme. Also, the compression scheme comprises a difference value that is the difference between a first integral image sum disposed along an edge of the integral image and an intermediate integral image sum spaced inward from, and along a same row or column as, the first integral image sum, and where the difference value is used to reconstruct the integral image.

Otherwise, the compression scheme recites one integral image sum for at least sixteen pixel locations, the compression scheme comprises arranging at least part of an integral image sum, at least part of a pixel value, and at least part of a total of a row or column of pixel values to equal 32 bits, and the integral image sum is separated into a plurality of nibbles or bit pieces.

By yet another aspect, a non-transitory medium has instructions that when executed, cause a computer to establish at least one integral image sum of an integral image associated with a block of pixels of an image and having pixel values. Each integral image sum is associated with a pixel location and a pixel value at the pixel location. The instructions also cause the computer to place data on at least one cacheline according to a compression scheme. The data comprises at least one integral image sum, at least one pixel value, and at least one total of at least part of a row or column of the pixel values from the image and including at least one pixel value in the block of pixels. The instructions may also cause the computer generate at least part of the integral image based on the compression scheme.

By other approaches, the at least one total of at least part of a row or column comprises at least one of: pixel values extending from an edge of the image and to a pixel location within the block of pixels, pixel values extending in a direction from an edge of the image and to a pixel value within the block of pixels and along a row or column forming an edge of the block of pixels, the total of a row of pixels from the left-most pixel value of the image to the left-most pixel value in the block of pixels along the same row, and the total of a column of pixels from the upper-most pixel value of the image to the upper-most pixel value in the block of pixel data and along the same column.

Otherwise, the instructions cause the computer to place the compression scheme on less cachelines than the minimum number of cachelines needed to transmit all of the integral image sums of the integral image, where the compression scheme comprises using a single 64 byte cacheline to transmit data to reconstruct a 128 byte integral image, where the integral image comprises thirty-two integral image sums using 32 bits per sum, and where the compression scheme comprises using at least one of:

(A) a compression scheme having:
(1) eight integral image sums,
(2) twenty-four or twenty-one pixel values at 8 bits per pixel value, and
(3) three row totals or three column totals, and (B) a compression scheme having:
(1) two integral image sums,
(2) fifteen pixel values, and
(3) fifteen totals of a row of pixel values or fifteen totals of a column of pixel values.

By other approaches, 19-24 bits are reserved for each of the three row totals or three column totals, or the three row totals or three column totals are 21 or 24 bits each. The pixel values are luminance values, and the compression scheme comprises both at least one total of a row of pixel values and at least one total of a column of pixel values.

The instructions may also cause the computer to provide at least one of: the non-integral image sum values in the compression scheme use less than 32 bits each, and the compression scheme comprises reserving less than 32 bits for each row or column total of pixel values in the compression scheme. Also, the compression scheme comprises a difference value that is the difference between a first integral image sum disposed along an edge of the integral image and an intermediate integral image sum spaced inward from, and along a same row or column as, the first integral image sum, and where the difference value is used to reconstruct the integral image.

Otherwise, the compression scheme recites one integral image sum for at least sixteen pixel locations, the compression scheme comprises arranging at least part of an integral image sum, at least part of a pixel value, and at least part of a total of a row or column of pixel values to equal 32 bits, and the integral image sum is separated into a plurality of nibbles or bit pieces.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method for integral image coding comprising:
   establishing at least one integral image sum of an integral image associated with a block of pixels of an image and having pixel values, each integral image sum being associated with a pixel location and a pixel value at the pixel location;
   placing data on at least one cacheline according to a compression scheme so that the data occupies a cacheline at the same time and is used to generate at least part of the integral image without placing data from other parts of the integral image on the cacheline at the same time as the data, the data comprising (1) at least one integral image sum, (2) at least one pixel value, and (3) at least one total of at least part of a row or column of the pixel values from the image and including at least one pixel value in the block of pixels; and
   generating at least part of the integral image based on the compression scheme.

2. The method of claim 1 wherein the at least one total of at least part of a row or column comprises pixel values extending from an edge of the image and to a pixel location within the block of pixels.

3. The method of claim 1 wherein the at least one total of at least part of a row or column comprises pixel values extending in a direction from an edge of the image and to a pixel value within the block of pixels and along a row or column forming an edge of the block of pixels.

4. The method of claim 1 comprising placing the compression scheme on less cachelines than the minimum number of cachelines needed to transmit all of the integral image sums of the integral image.

5. The method of claim 1 wherein the compression scheme comprises using a single 64 byte cacheline to transmit data to reconstruct a 128 byte integral image.

6. The method of claim 1 wherein the integral image comprises thirty-two integral image sums using 32 bits per sum, and wherein the compression scheme comprises using:
   (1) eight integral image sums,
   (2) twenty-four or twenty-one pixel values at 8 bits per pixel value, and
   (3) three row totals or three column totals.

7. The method of claim 6 wherein at least one of:
   19-24 bits are reserved for each of the three row totals or three column totals, and
   the three row totals or three column totals are 21 or 24 bits each.

8. The method of claim 1 wherein the total of row values comprises the total of a row of pixels from the left-most pixel value of the image to the left-most pixel value in the block of pixels along the same row.

9. The method of claim 1 wherein the total of column values comprises the total of a column of pixels from the upper-most pixel value of the image to the upper-most pixel value in the block of pixel data and along the same column.

10. The method of claim 1 wherein the compression scheme comprises both at least one total of a row of pixel values and at least one total of a column of pixel values.

11. The method of claim 1 wherein the compression scheme comprises:
    (1) two integral image sums,
    (2) fifteen pixel values, and
    (3) fifteen totals of a row of pixel values or fifteen totals of a column of pixel values.

12. The method of claim 1 wherein the compression scheme comprises a difference value that is the difference between a first integral image sum disposed along an edge of the integral image and an intermediate integral image sum spaced inward from, and along a same row or column as, the first integral image sum, and wherein the difference value is used to reconstruct the integral image.

13. The method of claim 1 wherein the compression scheme recites one integral image sum for at least sixteen pixel locations.

14. The method of claim 1 wherein the compression scheme comprises arranging at least part of an integral image sum, at least part of a pixel value, and at least part of a total of a row or column of pixel values to equal 32 bits.

15. The method of claim 1 wherein the integral image sum is separated into a plurality of nibbles.

16. The method of claim 1 wherein the at least one total of at least part of a row or column comprises at least one of:
   pixel values extending from an edge of the image and to a pixel location within the block of pixels,
   pixel values extending in a direction from an edge of the image and to a pixel value within the block of pixels and along a row or column forming an edge of the block of pixels,
   the total of a row of pixels from the left-most pixel value of the image to the left-most pixel value in the block of pixels along the same row, and
   the total of a column of pixels from the upper-most pixel value of the image to the upper-most pixel value in the block of pixel data and along the same column;
   the method comprising placing the compression scheme on less cachelines than the minimum number of cachelines needed to transmit all of the integral image sums of the integral image;
   wherein the compression scheme comprises using a single 64 byte cacheline to transmit data to reconstruct a 128 byte integral image;
   wherein the integral image comprises thirty-two integral image sums using 32 bits per sum, and wherein the compression scheme comprises using at least one of:
   (A) a compression scheme having:
   (1) eight integral image sums,
   (2) twenty-four or twenty-one pixel values at 8 bits per pixel value, and
   (3) three row totals or three column totals, and
   (B) a compression scheme having:
   (1) two integral image sums,
   (2) fifteen pixel values, and
   (3) fifteen totals of a row of pixel values or fifteen totals of a column of pixel values;
   wherein at least one of:
   19-24 bits are reserved for each of the three row totals or three column totals, and
   the three row totals or three column totals are 21 or 24 bits each;
   wherein the pixel values are luminance values;
   wherein the compression scheme comprises both at least one total of a row of pixel values and at least one total of a column of pixel values;
   wherein at least one of:
   the non-integral image sum values in the compression scheme use less than 32 bits each, and
   the compression scheme comprises reserving less than 32 bits for each row or column total of pixel values in the compression scheme;
   wherein the compression scheme comprises a difference value that is the difference between a first integral image sum disposed along an edge of the integral image and an intermediate integral image sum spaced inward from, and along a same row or column as, the first integral image sum, and wherein the difference value is used to reconstruct the integral image;
   wherein the compression scheme recites one integral image sum for at least sixteen pixel locations;
   wherein the compression scheme comprises arranging at least part of an integral image sum, at least part of a pixel value, and at least part of a total of a row or column of pixel values to equal 32 bits;
   wherein the integral image sum is separated into a plurality of nibbles or bit pieces.

17. A system for integral image coding comprising:
   at least one display;
   at least one processing unit communicatively coupled to the display;
   at least one cache memory communicatively coupled to the processing unit and configured for receiving and storing cachelines;
   at least one main memory communicatively coupled to the at least one processor; and
   an integral image module of the at least one processing unit configured to code an integral image onto or from at least one cacheline, and being configured to:
      establish at least one integral image sum of an integral image associated with a block of pixels of an image and having pixel values, each integral image sum being associated with a pixel location and a pixel value at the pixel location;
      place data on at least one cacheline according to a compression scheme so that the data occupies a cacheline at the same time and is used to generate at least part of the integral image without placing data from other parts of the integral image on the cacheline at the same time as the data, the data comprising (1) at least one integral image sum, (2) at least one pixel value, and (3) at least one total of at least part of a row or column of the pixel values from the image and including at least one pixel value in the block of pixels; and
      generate at least part of the integral image based on the compression scheme.

18. The system of claim 17 wherein the at least one total of at least part of a row or column comprises at least one of:
   pixel values extending from an edge of the image and to a pixel location within the block of pixels,
   pixel values extending in a direction from an edge of the image and to a pixel value within the block of pixels and along a row or column forming an edge of the block of pixels,
   the total of a row of pixels from the left-most pixel value of the image to the left-most pixel value in the block of pixels along the same row, and
   the total of a column of pixels from the upper-most pixel value of the image to the upper-most pixel value in the block of pixel data and along the same column;
   the integral image module being configured to place the compression scheme on less cachelines than the minimum number of cachelines needed to transmit all of the integral image sums of the integral image;
   wherein the compression scheme comprises a single 64 byte cacheline to transmit data to reconstruct a 128 byte integral image;
   wherein the integral image comprises thirty-two integral image sums using 32 bits per sum, and wherein the compression scheme comprises using at least one of:

(A) a compression scheme having:
(1) eight integral image sums,
(2) twenty-four or twenty-one pixel values at 8 bits per pixel value, and
(3) three row totals or three column totals, and
(B) a compression scheme having:
(1) two integral image sums,
(2) fifteen pixel values, and
(3) fifteen totals of a row of pixel values or fifteen totals of a column of pixel values;
wherein at least one of:
19-24 bits are reserved for each of the three row totals or three column totals, and
the three row totals or three column totals are 21 or 24 bits each;
wherein the pixel values are luminance values;
wherein the compression scheme comprises both at least one total of a row of pixel values and at least one total of a column of pixel values;
wherein at least one of:
the non-integral image sum values in the compression scheme use less than 32 bits each, and
the compression scheme comprises spaces less than 32 bits each for each row or column total of pixel values in the compression scheme;
wherein the compression scheme comprises a difference value that is the difference between a first integral image sum disposed along an edge of the integral image and an intermediate integral image sum spaced inward from, and along a same row or column as, the first integral image sum, and wherein the difference value is used to reconstruct the integral image;
wherein the compression scheme recites one integral image sum for at least sixteen pixel locations;
wherein the compression scheme comprises at least part of an integral image sum, at least part of a pixel value, and at least part of a total of a row or column of pixel values arranged to equal 32 bits;
wherein the integral image sum is separated into a plurality of nibbles or bit pieces.

19. A non-transitory medium having instructions that when executed, cause a computer to:
establish at least one integral image sum of an integral image associated with a block of pixels of an image and having pixel values, each integral image sum being associated with a pixel location and a pixel value at the pixel location;
place data on at least one cacheline according to a compression scheme so that the data occupies a cacheline at the same time and is used to generate at least part of the integral image without placing data from other parts of the integral image on the cacheline at the same time as the data, the data comprising (1) at least one integral image sum, (2) at least one pixel value, and (3) at least one total of at least part of a row or column of the pixel values from the image and including at least one pixel value in the block of pixels; and
generate at least part of the integral image based on the compression scheme.

20. The non-transitory medium of claim 19 wherein the at least one total of at least part of a row or column comprises at least one of:
pixel values extending from an edge of the image and to a pixel location within the block of pixels,
pixel values extending in a direction from an edge of the image and to a pixel value within the block of pixels and along a row or column forming an edge of the block of pixels,
the total of a row of pixels from the left-most pixel value of the image to the left-most pixel value in the block of pixels along the same row, and
the total of a column of pixels from the upper-most pixel value of the image to the upper-most pixel value in the block of pixel data and along the same column;
the instructions when executed causing the computer to place the compression scheme on less cachelines than the minimum number of cachelines needed to transmit all of the integral image sums of the integral image;
wherein the compression scheme comprises using a single 64 byte cacheline to transmit data to reconstruct a 128 byte integral image;
wherein the integral image comprises thirty-two integral image sums using 32 bits per sum, and wherein the compression scheme comprises using at least one of:
(A) a compression scheme having:
(1) eight integral image sums,
(2) twenty-four or twenty-one pixel values at 8 bits per pixel value, and
(3) three row totals or three column totals, and
(B) a compression scheme having:
(1) two integral image sums,
(2) fifteen pixel values, and
(3) fifteen totals of a row of pixel values or fifteen totals of a column of pixel values;
wherein at least one of:
19-24 bits are reserved for each of the three row totals or three column totals, and
the three row totals or three column totals are 21 or 24 bits each;
wherein the pixel values are luminance values;
wherein the compression scheme comprises both at least one total of a row of pixel values and at least one total of a column of pixel values;
wherein at least one of:
the non-integral image sum values in the compression scheme use less than 32 bits each, and
the compression scheme comprises reserving less than 32 bits for each row or column total of pixel values in the compression scheme;
wherein the compression scheme comprises a difference value that is the difference between a first integral image sum disposed along an edge of the integral image and an intermediate integral image sum spaced inward from, and along a same row or column as, the first integral image sum, and wherein the difference value is used to reconstruct the integral image;
wherein the compression scheme recites one integral image sum for at least sixteen pixel locations;
wherein the compression scheme comprises arranging at least part of an integral image sum, at least part of a pixel value, and at least part of a total of a row or column of pixel values to equal 32 bits;
wherein the integral image sum is separated into a plurality of nibbles or bit pieces.

\* \* \* \* \*